US012444566B2

(12) United States Patent
Sar et al.

(10) Patent No.: US 12,444,566 B2
(45) Date of Patent: Oct. 14, 2025

(54) TRAVELING WAVE TUBE

(71) Applicant: Raytheon Company, Waltham, MA (US)

(72) Inventors: David R. Sar, Corona, CA (US); Adam M. Conway, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 788 days.

(21) Appl. No.: 17/660,376

(22) Filed: Apr. 22, 2022

(65) Prior Publication Data

US 2023/0343542 A1 Oct. 26, 2023

(51) Int. Cl.
*H01J 23/24* (2006.01)
*H01J 23/06* (2006.01)

(52) U.S. Cl.
CPC .............. *H01J 23/24* (2013.01); *H01J 23/06* (2013.01)

(58) Field of Classification Search
None
See application file for complete search history.

(56) References Cited

U.S. PATENT DOCUMENTS 2,900,557 A 8/1959 Webber et al.
4,115,721 A * 9/1978 Friz ........................ H01J 23/26 445/29
4,370,596 A * 1/1983 Winsor ................... H01J 23/26 315/3.6
5,038,076 A * 8/1991 Smith ..................... H01J 23/26 315/3.5
6,356,023 B1 * 3/2002 Kosmahl ............... H01J 23/165 315/3.5
2016/0099127 A1 * 4/2016 Aditya .................... H01J 23/28 315/39
2021/0367573 A1 * 11/2021 Lagally ..................... H03F 3/58

OTHER PUBLICATIONS

PCT International Search Report and Written Opinion dated Aug. 18, 2023 for International Application No. PCT/US2023/062339; 23 Pages.
PCT Partial International Search Report dated Jun. 27, 2023 for International Application No. PCT/US2023/062339; 14 Pages.

* cited by examiner

*Primary Examiner* — Kenneth B Wells

(57) ABSTRACT

Described herein is a traveling wave tube (TWT), comprising an electron gun configured to generate an electron beam (E-beam); a signal injector configured to generate a radio frequency (RF) signal; a slow wave structure (SWS) having an aperture configured to combine the E-beam and the RF signal; an outer wall enclosing the SWS; and at least one electromagnetically-active material on one of (1) at least one projection on at least one of a periphery of the SWS and on a side of the outer wall facing the SWS and (2) the periphery of the SWS configured to receive at least one electromagnetic signal to control, on-the-fly, amplification of the RF signal by maximizing dampening of spurious modes while minimizing dampening of operating modes.

20 Claims, 5 Drawing Sheets

SWS

TRAVELING WAVE TUBE

BACKGROUND

Coaxial traveling wave tube (TWT) pulsed power amplifier tube designs are very wide band, high power output devices. A slow wave structure (SWS) is common in a TWT. In low power TWTs, an SWS is in the form of a helix of copper wire or tubing. Due to a cylindrical symmetry of the SWS, unwanted azimuthal modes may form. Thus, an SWS that allows for wide band operation is prone to unwanted spurious modes which steal power from desired operating modes within the TWT.

The current state of the art includes areas of passively resistive material in an SWS of a TWT to damp out unwanted modes. However, including areas of passively resistive material in an SWS of a TWT with sufficient margin to account for unknown interference means that there is unwanted damping of the main modes as well.

Some conventional TWTs place an excessive amount of damping material in the TWT to account for all possible modes, at the expense of overall output efficiency and TWT gain.

SUMMARY

In accordance with the concepts described herein, an example TWT and method provides a very high power TWT that comprises an SWS in the form of a rod with at least one projection (e.g., fins), where the at least one projection interacts with a passing electron beam to amplify radio frequency (RF) signals.

In accordance with the concepts described herein, an example TWT and method mitigate unwanted azimuthal modes using tabs of electromagnetically controlled resistive material placed in or about fins of an SWS.

In accordance with the concepts described herein, an example TWT and method provide electromagnetically (e.g., optically) active materials (e.g., Silicon (Si), Germanium (Ge), Silicon Carbide (SiC), Gallium Arsenide (GaAs), Gallium Nitride (GaN), Gallium Oxide (Ga2O3), Semiconducting Diamond, Aluminum Nitride (AlN), etc.) for damping sections of an SWS of a TWT or CoTWT slow wave structure.

In accordance with the concepts described herein, an example TWT and method provide electromagnetically (e.g., optically) active materials (e.g., Si, Ge, SiC, GaAs, GaN, Ga2O3, AlN, Diamond, etc.) for an entire SWS of a TWT.

In accordance with the concepts described herein, an example TWT and method applies an electrical signal to active portions of an SWS of a TWT to actively configure an electrical response of the TWT.

In accordance with the concepts described herein, an example TWT and method optically (e.g., via fiber optics) illuminates active portions of an SWS of a TWT to actively configure an electrical response of the TWT.

In accordance with the concepts described herein, an example TWT and method utilizes electromagnetically (e.g., electrical and optical) active materials for damping structures (e.g., an SWS) which will change resistive/conductive properties of the damping structures when exposed to electromagnetism (e.g., electricity or light), provided through connections (e.g., electrical connections or optical fibers) for various TWT architectures.

In accordance with the concepts described herein, an example TWT and method provide real time tube configuration and active mode suppression.

In accordance with the concepts described herein, an example TWT and method provide modulation and control of an RF signal.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals designate corresponding parts throughout the different views. Furthermore, embodiments are illustrated by way of example and not limitation in the figures, in which.

DETAILED DESCRIPTION

Example embodiment of the present disclosure provides a TWT device and method that utilizes electromagnetically (e.g., electrical and/or optical) active materials for damping structures (e.g., an SWS) which will change resistive/conductive properties of the damping structures when exposed to electromagnetism (e.g., electricity or light), provided through connections (e.g., electrical connections or optical fibers). This will allow for on-the-fly reconfiguration of damping properties of an SWS, resulting in smaller amounts of damping material and more efficient operation.

In accordance with the concepts described herein, an example TWT and method provides a very high power TWT that comprises an SWS in the form of a rod with at least one projection (e.g., fins), where the at least one projection interacts with a passing electron beam to amplify radio frequency (RF) signals.

Figure 1:
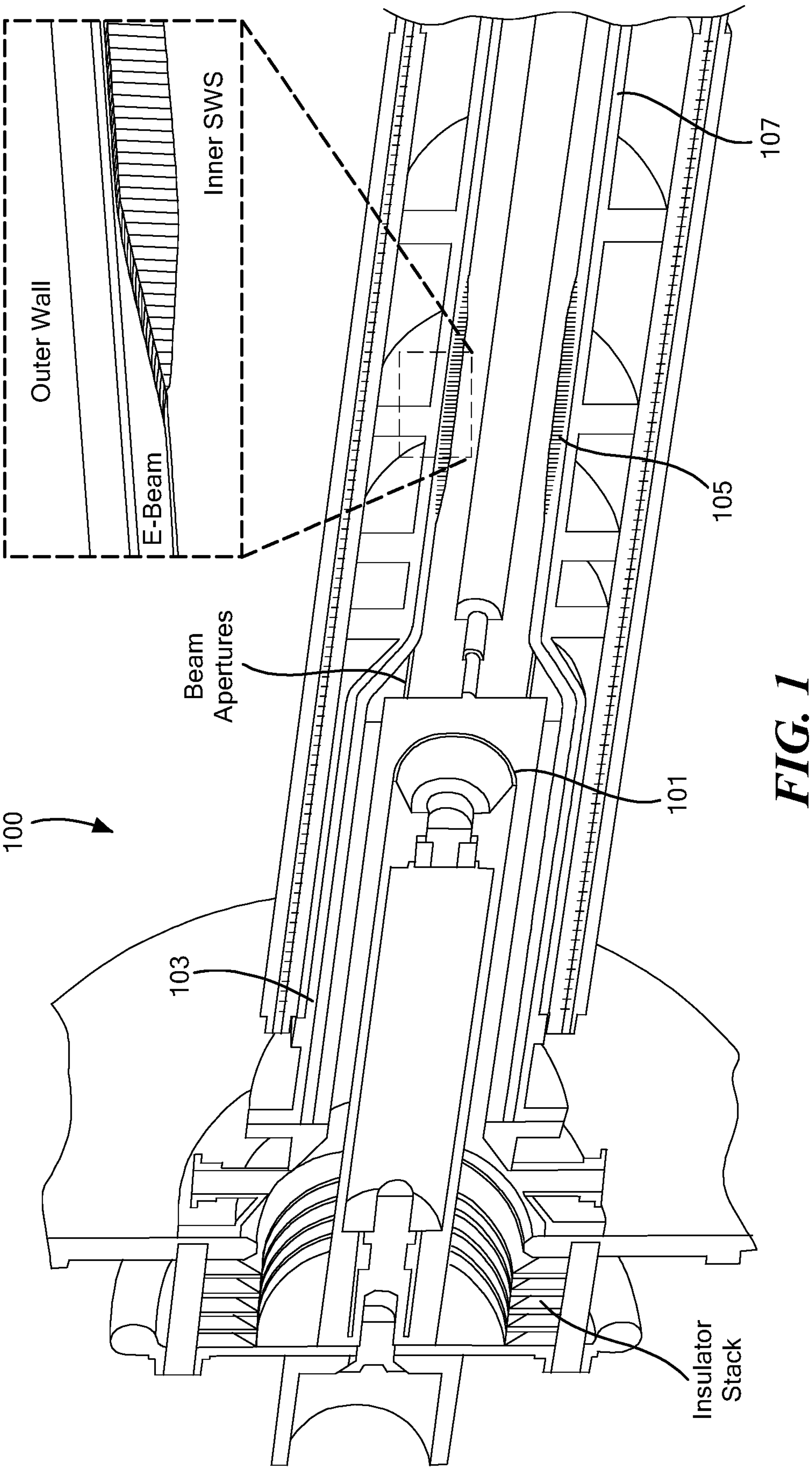
FIG. 1 is a perspective view of an example TWT in accordance with the concepts described herein.

FIG. 1 is a perspective view of an example TWT 100 in accordance with the concepts described herein. In an example embodiment, the TWT 100 has an electron gun 101, a signal injector 103, an SWS 105, and an outer wall 107 enclosing the SWS 105. The electron gun 101 emits an electron beam (e.g., an E-beam). The signal injector 103 injects an RF signal. The SWS 105 includes an aperture configured to cause the E-beam emitted from the electron gun 101 to combine with the RF signal injected by the signal injector 103. The combined E-beam and RF signal propagates between the periphery of the SWS 105 and the outer wall 107 along at least one portion of the SWS 105 (e.g., completely surrounding the periphery of the SWS 105, at two points along the periphery of the SWS 105 that are 180 degrees apart, at four points along the periphery of the SWS 105 that are each 90 degrees apart from an adjacent point, etc.).

The SWS 105 comprises at least one protrusion (e.g., at least one fin) along the periphery of the SWS 105 in which at least one electromagnetically active material (e.g., Si, Ge, SiC, GaAs, etc.) is placed and at least one electromagnetic signal (e.g., an electrical signal, an optical signal, etc.) controls an electrical parameter of the electromagnetically active material (e.g., resistivity, conductivity, dielectric permittivity, magnetic susceptibility, etc.) in order to modulate, on-the-fly, the combination of the E-beam and the RF signal to control an amplification of the RF signal by maximizing dampening of unwanted modes (e.g., unwanted azimuthal modes) and minimizing dampening of wanted modes.

In an example embodiment, the outer wall 107 may include at least one protrusion similar to the at least one protrusion on the SWS 105, where each of the at least one protrusion on the outer wall 107 may include at least one electromagnetically active tab controlled by at least one electromagnetic signal similarly as the at least one electromagnetically active tab on the SWS 105 is controlled. The depth/height, spacing, and periodicity of the at least one protrusion on the SWS 105 and/or the at least one protrusion on the outer wall 107 may be set to achieve a particular bandwidth for the RF signal (e.g., Hz, MHz, GHz, THz, etc.).

Figure 2:
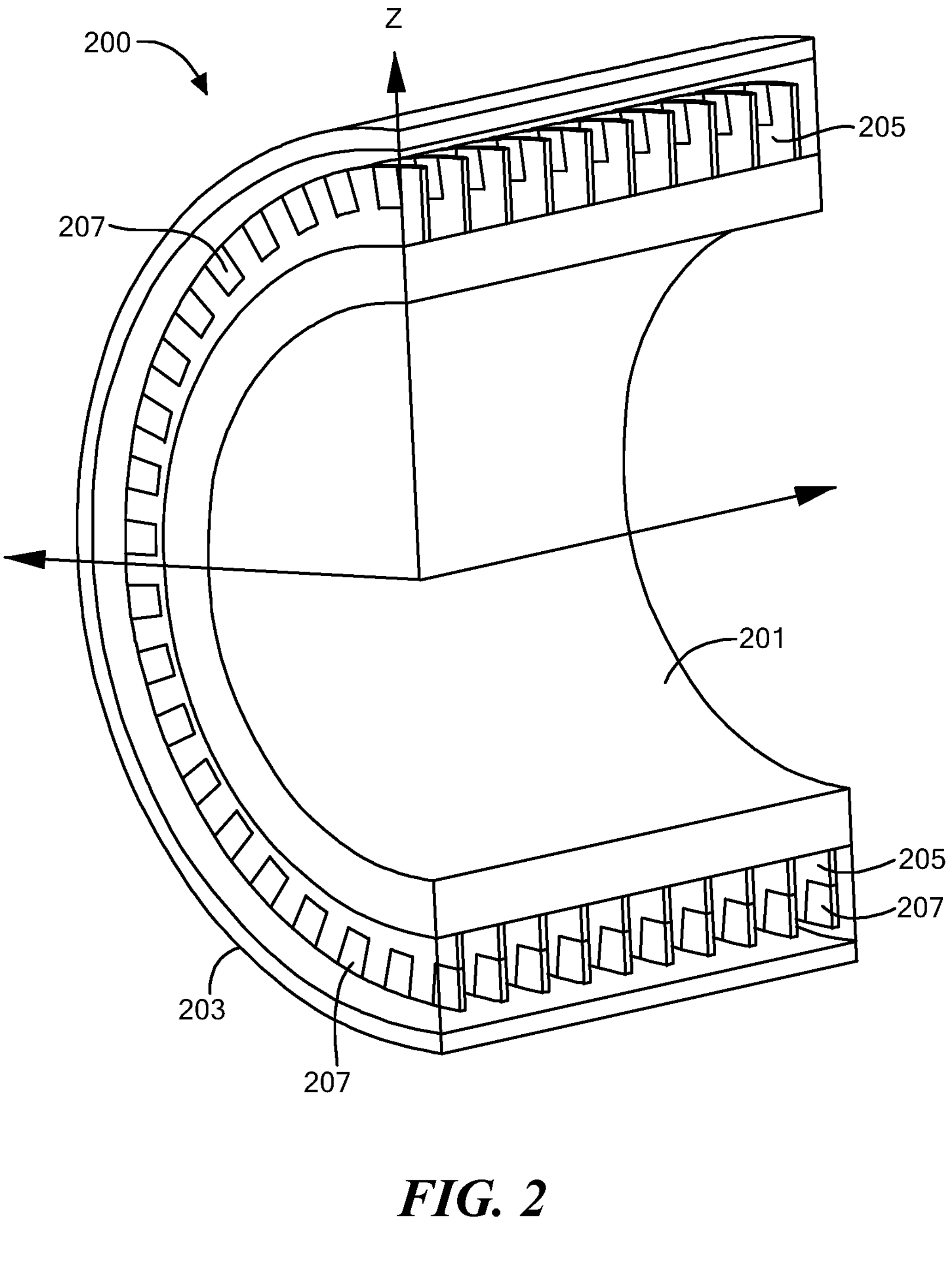
FIG. 2 is a perspective view of an example SWS in accordance with the concepts described herein.

FIG. 2 is a perspective view of an example slow wave structure (SWS) 200 in accordance with the concepts described herein.

In an example embodiment, a TWT includes the SWS 200, where the SWS 200 comprises an inner cylinder 201 and an outer wall 203, and where a combination of an E-beam and an RF signal propagates between the inner cylinder 201 and the outer wall 203 and along the length of the inner cylinder 201.

The inner cylinder 201 includes at least one protrusion 205 (e.g., at least one fin) along the periphery of the inner cylinder 201. The number of protrusions 205 is as few as one and as many as may functionally fit along the length of the inner cylinder 201. Each protrusion 205 includes at least one electromagnetically active tab 207 (e.g., electrically active, optically active, etc.). The number of electromagnetically active tabs 207 per protrusion 205 is as few as one and as many as may functionally fit around the circumference of a protrusion 205. An electromagnetic property of each electromagnetically active tab 207 (e.g., resistivity, conductivity, dielectric permittivity, magnetic susceptibility, etc.) is controlled by at least one electromagnetic signal (e.g., at least one electrical signal, at least one optical signal, etc.) connected to each electromagnetically active tab 207 in order to modulate, on-the-fly, a combination of an E-beam and an RF signal propagated along the periphery of the inner cylinder 201 in order to control an amplification of the RF signal by maximizing dampening of unwanted modes (e.g., unwanted azimuthal modes) and minimizing dampening of wanted modes. The number of electromagnetic signals applied to the electromagnetically active tabs 207 is as few as one and as many as one per electromagnetically active tab 207.

In an example embodiment, the outer wall 203 may include at least one protrusion similar to the at least one protrusion 205 on the SWS 200, where each of the at least one protrusion on the outer wall 203 may include at least one electromagnetically active tab controlled by at least one electromagnetic signal similarly as the at least one electromagnetically active tab 207 on the SWS 200 is controlled. The depth/height, spacing, and periodicity of the at least one protrusion on the SWS 200 and/or the at least one protrusion on the outer wall 203 may be set to achieve a particular bandwidth for the RF signal (e.g., Hz, MHz, GHz, THz, etc.).

In an example embodiment, each electromagnetically active tab 207 is an electromagnetically (e.g., optically) active material (e.g., Si, Ge, SiC, GaAs, GaN, Ga2O3, Diamond, AlN, etc.).

In an example embodiment, the entire inner cylinder 201, including each electromagnetically active tab 207, is an electromagnetically (e.g., optically) active material (e.g., Si, Ge, SiC, GaAs, GaN, Ga2O3, Diamond, AlN, etc.).

Figure 3:
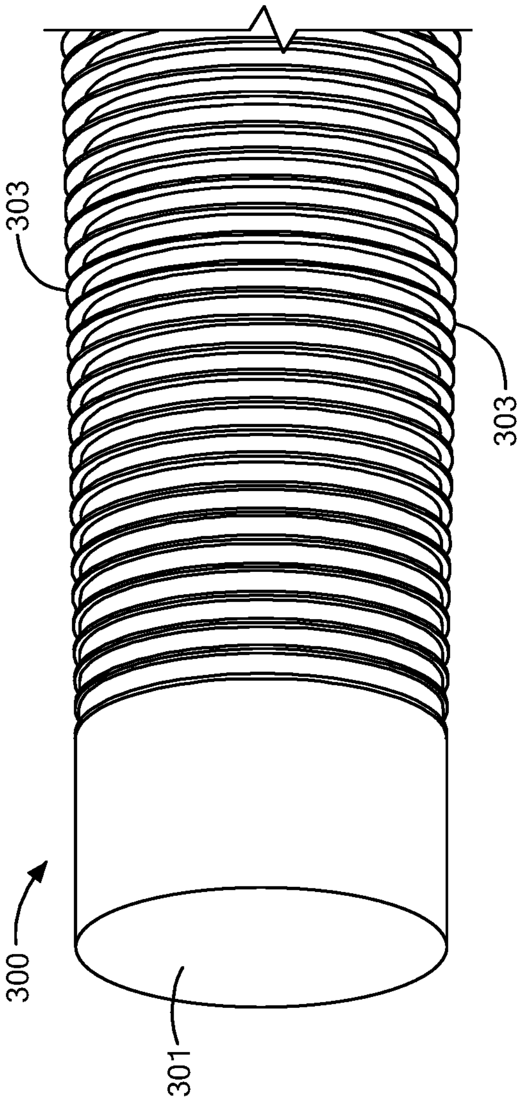
FIG. 3 is a perspective view of an example SWS in accordance with the concepts described herein.

FIG. 3 is a perspective view of an example SWS 300 in accordance with the concepts described herein.

In an example embodiment, a TWT includes the SWS 300, where the SWS 300 is a solid cylinder 301 that includes at least one protrusion 303 (e.g., at least one fin) along the periphery of the solid cylinder 301. The number of protrusions 303 is as few as one and as many as may functionally fit along the length of the solid cylinder 301. Each protrusion 303 includes at least one electromagnetically active tab (not shown) (e.g., electrically active, optically active, etc.). The number of electromagnetically active tabs per protrusion 303 is as few as one and as many as may functionally fit around the circumference of a protrusion 303. An electromagnetic property of each electromagnetically active tab (e.g., resistivity, conductivity, dielectric permittivity, magnetic susceptibility, etc.) is controlled by at least one electromagnetic signal (e.g., at least one electrical signal, at least one optical signal, etc.) connected to each electromagnetically active tab in order to modulate, on-the-fly, a combination of an E-beam and an RF signal propagated along the periphery of the solid cylinder 301 in order to control an amplification of the RF signal by maximizing dampening of unwanted modes (e.g., unwanted azimuthal modes) and minimizing dampening of wanted modes. The number of electromagnetic signals applied to the electromagnetically active tabs is as few as one and as many as one per electromagnetically active tab.

In an example embodiment, each electromagnetically active tab is an electromagnetically (e.g., optically) active material (e.g., Si, Ge, SiC, GaAs, GaN, Ga2O3, Diamond, AlN, etc.).

In an example embodiment, the entire solid cylinder 301, including each electromagnetically active tab, is an electromagnetically (e.g., optically) active material (e.g., Si, Ge, SiC, GaAs, GaN, Ga2O3, Diamond, AlN, etc.).

Figure 4:
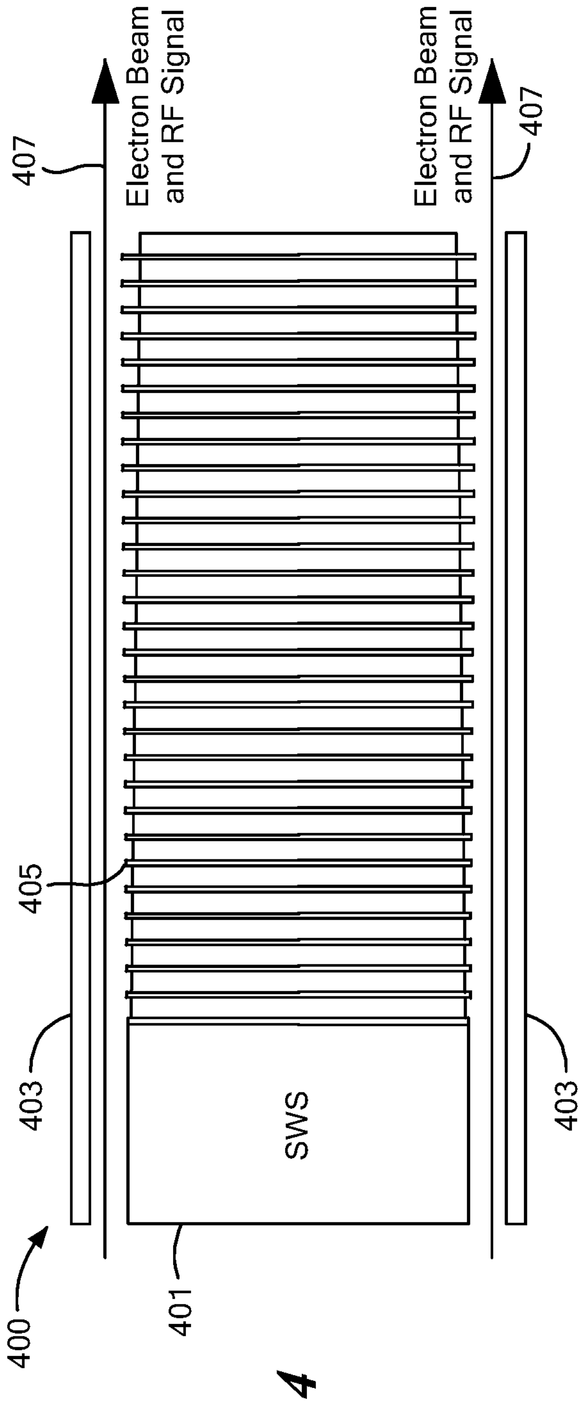
FIG. 4 is a side view of an example SWS in accordance with the concepts described herein.

FIG. 4 is a side view of an example SWS 400 in accordance with the concepts described herein.

In an example embodiment, a TWT includes the SWS 400, where the SWS 400 is a tapered cylinder 401 enclosed by an outer wall 407.

In an example embodiment, the tapered cylinder 401 may be hollow, solid, intermittently hollow and solid, and so on. The tapered cylinder 401 includes at least one protrusion 405 (e.g., at least one fin) along the periphery of the tapered cylinder 401. The number of protrusions 405 is as few as one and as many as may functionally fit along the length of the tapered cylinder 401. Each protrusion 405 includes at least one electromagnetically active tab (not shown) (e.g., electrically active, optically active, etc.). The number of electromagnetically active tabs per protrusion 405 is as few as one and as many as may functionally fit around the circumference of a protrusion 405. An electromagnetic property of each electromagnetically active tab (e.g., resistivity, conductivity, dielectric permittivity, magnetic susceptibility, etc.) is controlled by at least one electromagnetic signal (e.g., at least one electrical signal, at least one optical signal, etc.) connected to each electromagnetically active tab in order to modulate, on-the-fly, a combination of an E-beam and an RF signal 407 propagated between the tapered cylinder 401 and the outer wall 403 and along the periphery of the tapered cylinder 401 in order to control an amplification of the RF signal by maximizing dampening of unwanted modes (e.g., unwanted azimuthal modes) and minimizing dampening of wanted modes. The number of electromagnetic signals applied to the electromagnetically active tabs is as few as one and as many as one per electromagnetically active tab.

In an example embodiment, the outer wall 403 may include at least one protrusion similar to the at least one protrusion 405 on the SWS 400, where each of the at least one protrusion on the outer wall 403 may include at least one electromagnetically active tab controlled by at least one electromagnetic signal similarly as the at least one electromagnetically active tab on the SWS 400 is controlled. The depth/height, spacing, and periodicity of the at least one protrusion on the SWS 400 and/or the at least one protrusion on the outer wall 403 may be set to achieve a particular bandwidth for the RF signal (e.g., Hz, MHz, GHz, THz, etc.).

In an example embodiment, each electromagnetically active tab is an electromagnetically (e.g., optically) active material (e.g., Si, Ge, SiC, GaAs, GaN, Ga2O3, Diamond, AlN, etc.).

In an example embodiment, the entire tapered cylinder 401, including each electromagnetically active tab, is an electromagnetically (e.g., optically) active material (e.g., Si, Ge, SiC, GaAs, GaN, Gallium Oxide (Ga2O3), Diamond, Aluminum Nitride (AlN), etc.).

Figure 5:
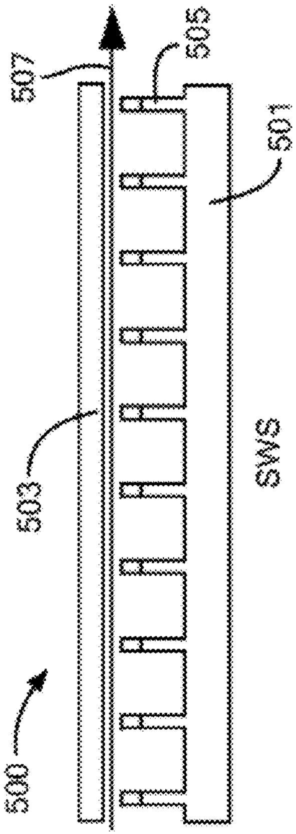
FIG. 5 is a side view of an example SWS in accordance with the concepts described herein.

FIG. 5 is a side view of an example SWS 500 in accordance with the concepts described herein.

In an example embodiment, a TWT includes the SWS 500, where the SWS 500 is a structure 501 and a wall 503.

In an example embodiment, the structure 501 may be a cylinder, a rectangle, an octagon, a hexagon, or any other suitably shaped structure. In addition, the structure 501 may be a tapered, hollow, solid, intermittently hollow and solid, and so on. The structure 501 includes at least one protrusion 505 (e.g., at least one fin) along a side of the structure 501 facing the wall 503. The number of protrusions 505 is as few as one and as many as may functionally fit along the length of the structure 501. Each protrusion 505 includes at least one electromagnetically active tab (not shown) (e.g., electrically active, optically active, etc.). The number of electromagnetically active tabs per protrusion 505 is as few as one and as many as may functionally fit on the protrusion 505. An electromagnetic property of each electromagnetically active tab (e.g., resistivity, conductivity, dielectric permittivity, magnetic susceptibility, etc.) is controlled by at least one electromagnetic signal (e.g., at least one electrical signal, at least one optical signal, etc.) connected to each electromagnetically active tab in order to modulate, on-the-fly, a combination of an E-beam and an RF signal 507 propagated between the structure 501 and the wall 503 and along the length of the structure 501 in order to control an amplification of the RF signal by maximizing dampening of unwanted modes (e.g., unwanted azimuthal modes) and minimizing dampening of wanted modes. The number of electromagnetic signals applied to the electromagnetically active tabs is as few as one and as many as one per electromagnetically active tab.

In an example embodiment, the wall 503 may include at least one protrusion similar to the at least one protrusion 505 on the structure 501, where each of the at least one protrusion on the wall 503 may include at least one electromagnetically active tab controlled by at least one electromagnetic signal similarly as the at least one electromagnetically active tab 505 are controlled. The depth/height, spacing, and periodicity of the at least one protrusion on the structure 501 and/or the at least one protrusion on the wall 503 may be set to achieve a particular bandwidth for the RF signal (e.g., Hz, MHz, GHz, THz, etc.).

In an example embodiment, each electromagnetically active tab is an electromagnetically (e.g., optically) active material (e.g., Si, Ge, SiC, GaAs, etc.).

In an example embodiment, the entire structure 501, including each electromagnetically active tab, is an electromagnetically (e.g., optically) active material (e.g., Si, Ge, SiC, GaAs, GaN, Ga2O3, Diamond, AlN, etc.).

Figure 6:
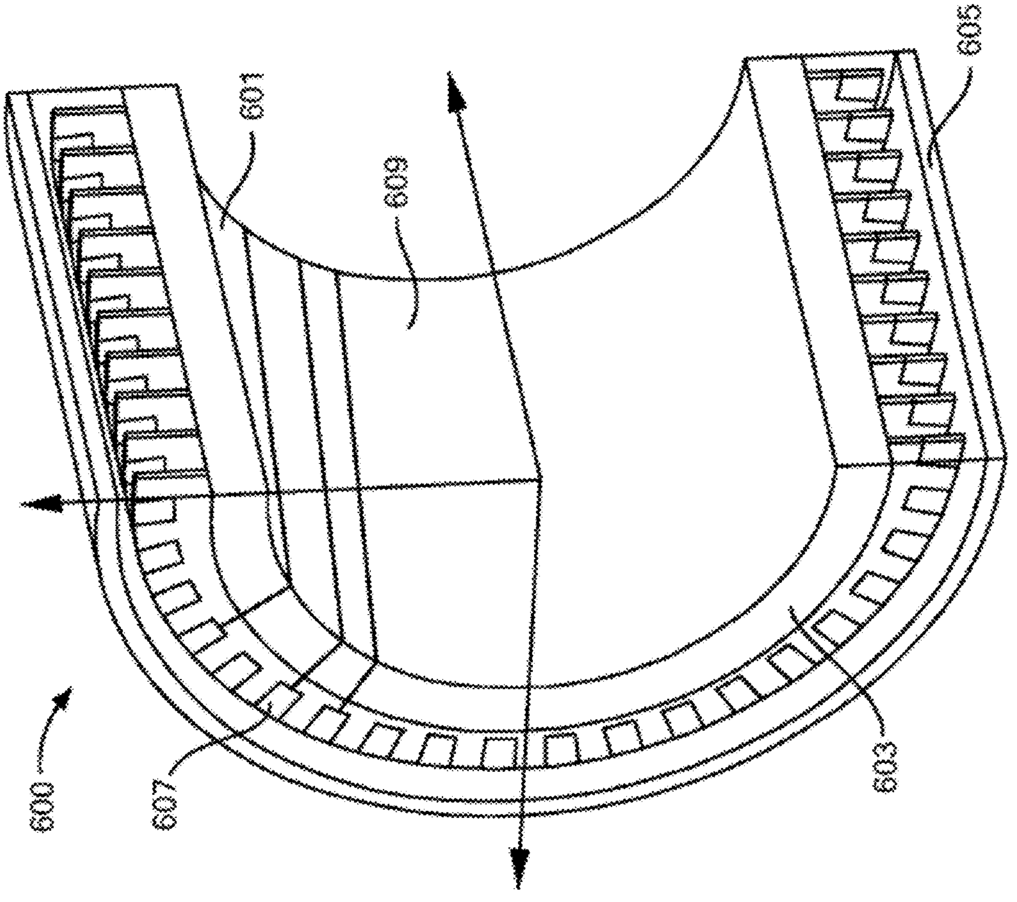
FIG. 6 is a perspective view of an example SWS in accordance with the concepts described herein.

FIG. 6 is a perspective view of an example SWS 600 in accordance with the concepts described herein.

In an example embodiment, a TWT includes the SWS 600, where the SWS 600 is a cylinder 601 enclosed by an outer wall 603.

In an example embodiment, the cylinder 601 may be hollow, solid, intermittently hollow and solid, and so on. The cylinder 601 includes at least one protrusion 605 (e.g., at least one fin) along the periphery of the cylinder 601. The number of protrusions 605 is as few as one and as many as may functionally fit along the length of the cylinder 601. Each protrusion 605 includes at least one electromagnetically active tab 607 (e.g., electrically active, optically active, etc.). The number of electromagnetically active tabs 607 per protrusion 605 is as few as one and as many as may functionally fit around the circumference of a protrusion 605. An electromagnetic property of each electromagnetically active tab 607 (e.g., resistivity, conductivity, dielectric permittivity, magnetic susceptibility, etc.) is controlled by at least one electromagnetic signal 609 (e.g., at least one electrical signal, at least one optical signal, etc.) connected to each electromagnetically active tab 607 in order to modulate, on-the-fly, a combination of an E-beam and an RF signal propagated between the cylinder 601 and the outer wall 603 and along the periphery of the cylinder 601 in order to control an amplification of the RF signal by maximizing dampening of unwanted modes (e.g., unwanted azimuthal modes) and minimizing dampening of wanted modes. The number of electromagnetic signals 609 applied to the electromagnetically active tabs 607 is as few as one and as many as one per electromagnetically active tab 607.

In an example embodiment, the outer wall 603 may include at least one protrusion similar to the at least one protrusion 605 on the SWS 600, where each of the at least one protrusion on the outer wall 603 may include at least one electromagnetically active tab controlled by at least one electromagnetic signal similarly as the at least one electromagnetically active tab 607 on the SWS 600 is controlled. The depth/height, spacing, and periodicity of the at least one protrusion on the SWS 600 and/or the at least one protrusion on the outer wall 603 may be set to achieve a particular bandwidth for the RF signal (e.g., Hz, MHz, GHz, THz, etc.).

In an example embodiment, each electromagnetically active tab is an electromagnetically (e.g., optically) active material (e.g., Si, Ge, SiC, GaAs, GaN, Ga2O3, Diamond, AlN, etc.).

In an example embodiment, the entire tapered cylinder 401, including each electromagnetically active tab, is an electromagnetically (e.g., optically) active material (e.g., Si, Ge, SiC, GaAs, GaN, Ga2O3, Diamond, AlN, etc.).

Figure 7:
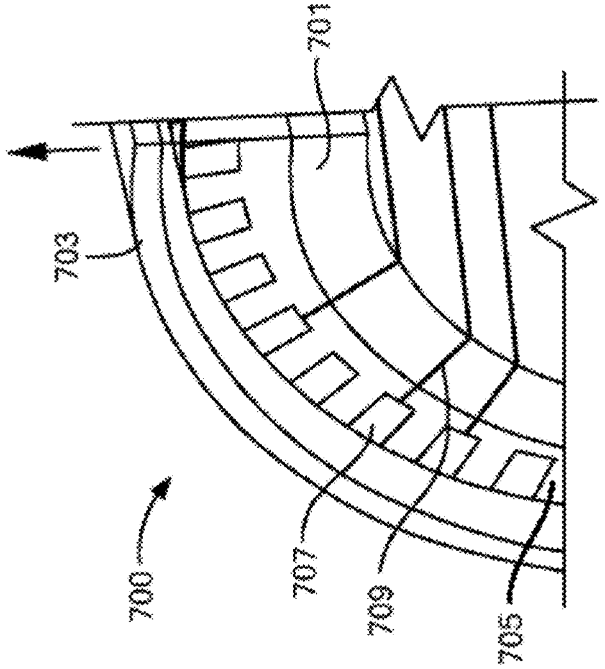
FIG. 7 is a sectional perspective view of an example SWS in accordance with the concepts described herein.

FIG. 7 is a sectional perspective view of an example SWS 700 in accordance with the concepts described herein.

In an example embodiment, a TWT includes the SWS 700, where the SWS 700 is a cylinder 701 enclosed by an outer wall 703.

In an example embodiment, the cylinder 701 may be hollow, solid, intermittently hollow and solid, and so on. The cylinder 701 includes at least one protrusion 705 (e.g., at least one fin) along the periphery of the cylinder 701. The number of protrusions 705 is as few as one and as many as may functionally fit along the length of the cylinder 701. Each protrusion 705 includes at least one electromagnetically active tab 707 (e.g., electrically active, optically active, etc.). The number of electromagnetically active tabs 707 per protrusion 705 is as few as one and as many as may functionally fit around the circumference of a protrusion 705. An electromagnetic property of each electromagnetically active tab 707 (e.g., resistivity, conductivity, dielectric permittivity, magnetic susceptibility, etc.) is controlled by at least one electromagnetic signal 709 (e.g., at least one electrical signal, at least one optical signal, etc.) connected to each electromagnetically active tab 707 in order to modulate, on-the-fly, a combination of an E-beam and an RF signal propagated between the cylinder 701 and the outer wall 703 and along the periphery of the cylinder 701 in order to control an amplification of the RF signal by maximizing dampening of unwanted modes (e.g., unwanted azimuthal modes) and minimizing dampening of wanted modes. The number of electromagnetic signals 709 applied to the electromagnetically active tabs 707 is as few as one and as many as one per electromagnetically active tab 707.

In an example embodiment, the outer wall 703 may include at least one protrusion similar to the at least one protrusion 705 on the SWS 700, where each of the at least one protrusion on the outer wall 703 may include at least one electromagnetically active tab controlled by at least one electromagnetic signal similarly as the at least one electromagnetically active tab 707 on the SWS 700 is controlled. The depth/height, spacing, and periodicity of the at least one protrusion on the SWS 700 and/or the at least one protrusion on the outer wall 703 may be set to achieve a particular bandwidth for the RF signal (e.g., Hz, MHz, GHz, THz, etc.).

In an example embodiment, each electromagnetically active tab is an electromagnetically (e.g., optically) active material (e.g., Si, Ge, SiC, GaAs, GaN, Ga2O3, Diamond, AlN, etc.).

In an example embodiment, the entire tapered cylinder 401, including each electromagnetically active tab, is an electromagnetically (e.g., optically) active material (e.g., Si, Ge, SiC, GaAs, GaN, Ga2O3, Diamond, AlN, etc.).

In an example embodiment, an SWS may not include protrusions. Instead, a surface of the SWS may be completely covered with an electromagnetic material. The electromagnetic material may be contacted by at least one electromagnetic signal in at least one location on the electromagnetic material, where the electromagnetic material performs a function similar to the electromagnetically active tab described above.

Figure 8:
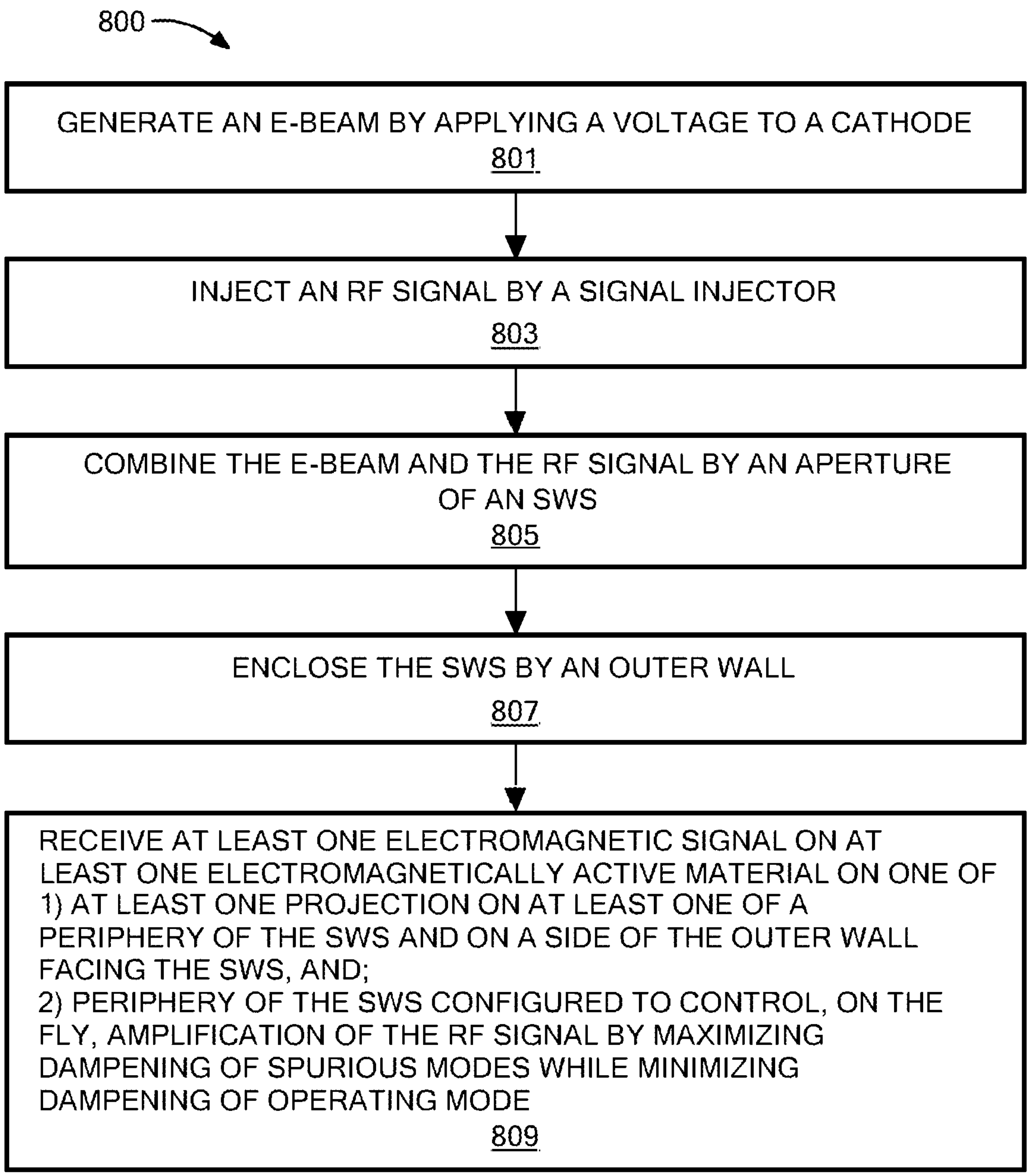
FIG. 8 is a flowchart of an example method of a TWT in accordance with the concepts described herein.

FIG. 8 is a flowchart of an example method 800 of a TWT in accordance with the concepts described herein.

In an example embodiment, the method 800 of a TWT comprises generating an electron beam (E-beam) by an electron gun in step 801.

Step 803 of the method 800 comprises injecting a radio frequency (RF) signal by a signal injector.

Step 805 of the method 800 comprises combining the E-beam and the RF signal by an aperture of a slow wave structure (SWS).

Step 807 of the method 800 comprises enclosing the SWS by an outer wall.

Step 809 of the method 800 comprises receiving at least one electromagnetic signal on at least one electromagnetically-active material on one of (1) at least one projection on at least one of a periphery of the SWS and on a side of the outer wall facing the SWS and (2) the periphery of the SWS is configured to control, on-the-fly, amplification of the RF signal by maximizing dampening of spurious modes while minimizing dampening of operating modes.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A traveling wave tube (TWT), comprising:

an electron gun configured to generate an electron beam (E-beam);

a signal injector configured to generate a radio frequency (RF) input signal;

a slow wave structure (SWS) comprising:

an inner structure;

an outer wall enclosing at least the inner structure; and an aperture configured to combine the E-beam and the RF signal within a space between the inner structure and the outer wall to generate an amplified RF signal; and at least one electromagnetically/electrooptically-active material on at least one of: (1) at least one projection on at least one of a periphery of the inner structure or on a side of the outer wall facing the inner structure or (2) the periphery of the inner structure, the at least one electromagnetically/electrooptically-active material configured to receive at least one electromagnetic signal to control, on-the-fly, amplification of the RF signal by adjusting dampening of spurious modes.

2. The TWT of claim 1, wherein the aperture of the SWS is configured to propagate the amplified RF signal along a path between the periphery of the inner structure and the outer wall so as to completely or partially surround the periphery of the inner structure.

3. The TWT of claim 1, wherein the at least one electromagnetically/electrooptically-active material comprises at least one of: Silicon (Si), Germanium (Ge), Silicon Carbide (SiC), Gallium Arsenide (GaAs), Gallium Nitride (GaN), Gallium Oxide ($Ga_2O_3$), Diamond, or Aluminum Nitride (AlN).

4. The TWT of claim 1, wherein the at least one electromagnetic signal comprises at least one of: at least one optical signal or at least one electrical signal.

5. The TWT of claim 1, wherein the at least one electromagnetically/electrooptically-active material is configured to have at least one property changed under control of the at least one electromagnetic signal, wherein the at least one property comprises at least one of: resistivity, conductivity, dielectric permittivity, or magnetic susceptibility.

6. The TWT of claim 5, wherein the inner structure has a shape of one of: a circular rod, a rectangle, an octagon, a hexagon, or a higher-order polygon; and wherein the inner structure is one of: hollow, solid, or intermittently hollow and solid.

7. The TWT of claim 5, wherein a depth/height, spacing, and periodicity of the at least one projection on the inner structure or the at least one projection on the outer wall is set to achieve a particular bandwidth for the RF signal.

8. The TWT of claim 1, wherein the at least one electromagnetically/electrooptically-active material has a number that is as few as one and as many as functionally fits on each of the at least one projection.

9. The TWT of claim 1, wherein the at least one electromagnetic signal is as few as one and as many as one per electromagnetically/electrooptically-active material.

10. The TWT of claim 1, wherein the SWS comprises at least one of: Silicon (Si), Germanium (Ge), Silicon Carbide (SiC), Gallium Arsenide (GaAs), Gallium Nitride (GaN), Gallium Oxide ($Ga_2O_3$), Diamond, or Aluminum Nitride (AlN).

11. A method for use with a traveling wave tube (TWT), comprising:

generating an electron beam (E-beam) by an electron gun;

injecting a radio frequency (RF) signal by a signal injector;

combining the E-beam and the RF signal by an aperture of a slow wave structure (SWS) within a space between an inner structure and an outer wall of the SWS; and receiving at least one electromagnetic signal on at least one electromagnetically/electrooptically-active material on at least one of: (1) at least one projection on at least one of a periphery of the inner structure or on a side of the outer wall facing the inner structure or (2) the periphery of the inner structure, the at least one electromagnetically/electrooptically-active material configured to control, on-the-fly, amplification of the RF signal by maximizing dampening of spurious modes while minimizing dampening of operating modes.

12. The method of claim 11, wherein the aperture of the SWS is configured to propagate the combined E-beam and RF signal along a path between the periphery of the inner structure and the outer wall so as to completely or partially surround the periphery of the inner structure.

13. The method of claim 11, wherein the at least one electromagnetically/electrooptically-active material comprises at least one of: Silicon (Si), Germanium (Ge), Silicon Carbide (SiC), Gallium Arsenide (GaAs), Gallium Nitride (GaN), Gallium Oxide ($Ga_2O_3$), Diamond, or Aluminum Nitride (AlN).

14. The method of claim 11, wherein the at least one electromagnetic signal comprises at least one of: at least one optical signal or at least one electrical signal.

15. The method of claim 11, wherein the at least one electromagnetically/electrooptically-active material is configured to have at least one property changed under control of the at least one electromagnetic signal, wherein the at least one property comprises at least one of: resistivity, conductivity, dielectric permittivity, or magnetic susceptibility.

16. The method of claim 15, wherein the inner structure has a shape of one of: a circular rod, a rectangle, an octagon, a hexagon, or a higher-order polygon; and wherein the inner structure is one of: hollow, solid, or intermittently hollow and solid.

17. The method of claim 15, wherein a depth/height, spacing, and periodicity of the at least one projection on the inner structure or the at least one projection on the outer wall is set to achieve a particular bandwidth for the RF signal.

18. The method of claim 11, wherein the at least one electromagnetically/electrooptically-active material has a number that is as few as one and as many as functionally fits on each of the at least one projection.

19. The method of claim 11, wherein the at least one electromagnetic signal is as few as one and as many as one per electromagnetically/electrooptically-active material.

20. The method of claim 11, wherein the SWS comprises at least one of: Silicon (Si), Germanium (Ge), Silicon Carbide (SiC), Gallium Arsenide (GaAs), Gallium Nitride (GaN), Gallium Oxide ($Ga_2O_3$), Diamond, or Aluminum Nitride (AlN).

* * * * *